Patented Dec. 2, 1952

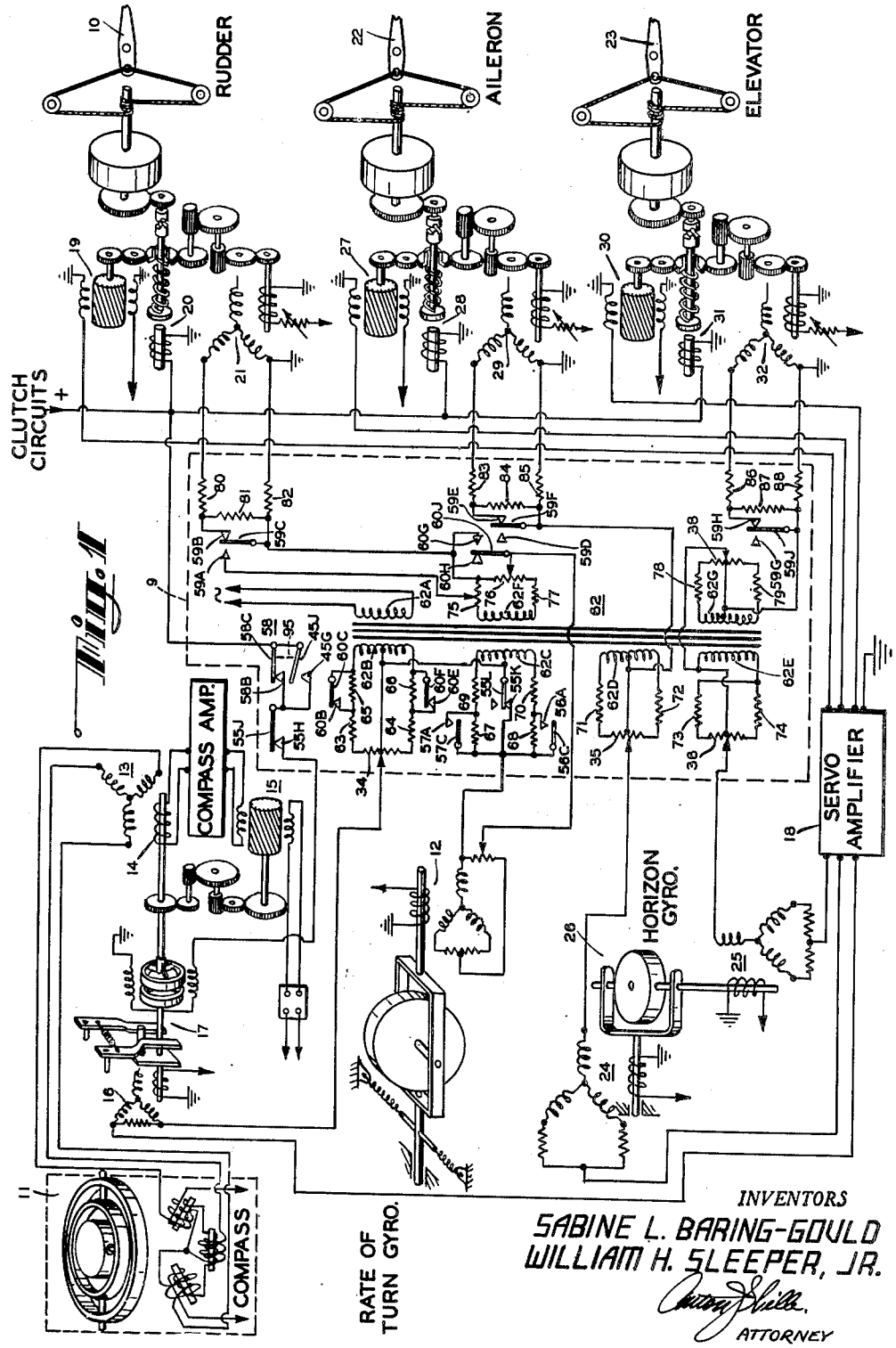

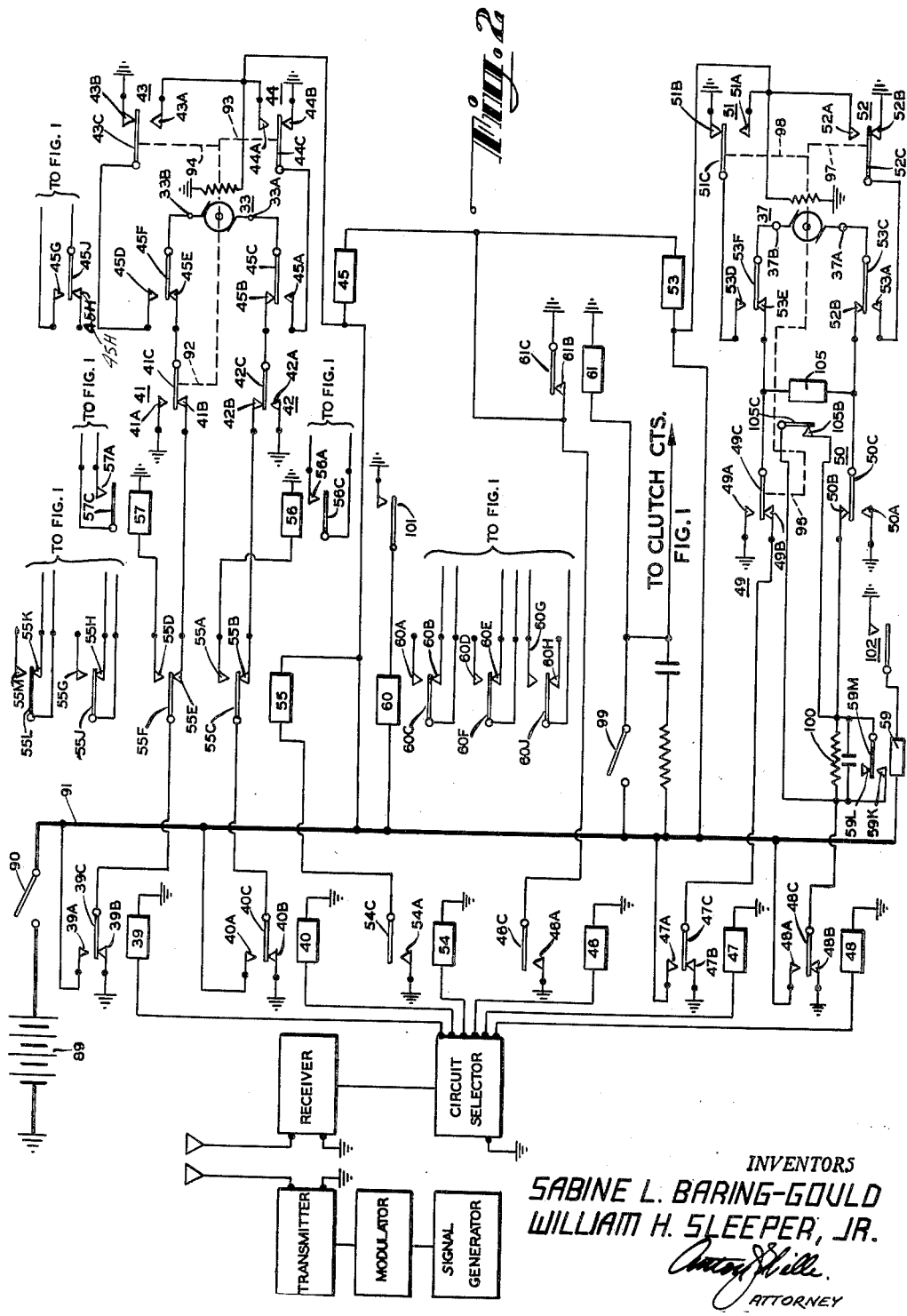

2,620,148

UNITED STATES PATENT OFFICE 2,620,148

RADIO-OPERATED CONTROLLER FOR ALL ELECTRIC AUTOMATIC PILOTS

Sabine L. Baring-Gould, New York, N. Y., and William H. Sleeper, Jr., Hackensack, N. J., assignors to Bendix Aviation Corporation, Teterboro, N. J., a corporation of Delaware Application March 31, 1947, Serial No. 738,438

11 Claims. (Cl. 244—77)

The present invention relates to an electric automatic pilot adapted to control the operations of an aircraft by means of signals remotely transmitted by radio.

The automatic steering of aircraft by means of automatic pilots is now a common practice. An all electric automatic pilot as described in copending applications Serial Number 516,488, filed December 31, 1943, and Serial Number 516,489, filed December 31, 1943, discloses manually operated means whereby displacement signals for each axis of control are imparted into the automatic pilot to deflect the various craft control surfaces into proper position for initiating the desired turn or change of attitude. It is desirable to be able to impart into the automatic pilot the displacement signals for each axis of control by means of signals remotely transmitted by radio from another plane or from any ground station.

An object of the present invention is to provide novel means whereby remotely transmitted displacement signals for each axis of control are imparted into an all electric automatic pilot to deflect the craft control surfaces into proper position for initiating the desired turn or change of attitude.

Another object of the present invention is to provide means whereby a remotely transmitted displacement signal for a turn is imparted into an all electric automatic pilot to deflect the craft control surfaces into proper position for initiating the desired co-ordinated turn.

Still another object of the present invention is to provide means whereby a remotely transmitted displacement signal for a "skid" turn is imparted into an all electric automatic pilot to deflect the rudder surface into proper position for initiating the desired "skid" turn.

A further object of the present invention is to provide means whereby a remotely transmitted displacement signal for a climb or dive is imparted into an electric automatic pilot to deflect the elevator surfaces into proper position for initiating a climb or dive.

A still further object of the present invention is to provide novel means whereby in response to a remotely transmitted displacement signal for either a co-ordinated or skid turn imparted into an electric automatic pilot, primary control of the turn by the direction control instrument is removed until a remotely transmitted signal for termination of operation is introduced to the direction control instrument to maintain the craft automatically on its new course.

Another objective of the present invention is to provide means whereby a remotely transmitted displacement signal for a climb or dive is imparted into an electric automatic pilot until a remotely transmitted signal for termination of operation is introduced to eliminate the displacement signal whereby the craft automatically assumes a level attitude.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention, reference being had for this purpose to the appended claims.

In the drawings, wherein like reference numerals refer to like parts:

Figure 1 is a diagrammatic illustration of an electric automatic steering system for mobile craft embodying the novel remotely actuated control unit of the present invention.

Figure 2 is a schematic diagram of the control circuit of the remotely actuated control unit of the present invention.

Referring now to the drawings for a more detailed description of the present invention, the controller unit 9 thereof is illustrated as embodied in an electric automatic pilot providing three axes of control of the character shown and described in aforementioned copending applications.

As more fully described in the aforementioned co-pending applications, the control of rudder 10, as shown in Figure 1, is derived from a gyro stabilized earth inductor type compass 11 and a rate of turn gyro pick-off 12. Compass 11 includes an inductive coupling device 13 having an angularly movable rotor 14, a motor 15 for displacing rotor 14, and a compass signal transmitter 16. The compass signal transmitter 16 is connected to the rudder channel of servo amplifier 18, the output of which energizes motor 19 to operate rudder 10 through clutch 20. The rate of turn signal of pick-off 12 is also impressed on the rudder channel of servo amplifier 18 in series with the potential of compass signal transmitter 16. Operation of rudder motor 19 displaces rudder 10 and also an inductive follow-up device 21 developing in the latter a follow-up potential which is impressed on the rudder channel of amplifier 18 in series with the potentials of the compass signal transmitter 16 and rate of turn pick-off 12.

Signals for operating aileron and elevator surfaces 22 and 23, on the other hand, are developed by bank and pitch take-offs 24 and 25 arranged about the bank and pitch axes of an artificial horizon gyro 26. As a result of a banked condition, take-off 24 develops a bank signal which is communicated to the input of the aileron channel of amplifier 18, the output of the channel being connected to energize a motor 27 which connects through a clutch 28 with aileron surface 22. Operation of motor 27 displaces an inductive follow-up device 29 developing a follow-up signal therein which is impressed on the aileron channel of amplifier 18 in series with the signal of bank take-off 24 to modify the operation of motor 27. In a similar manner, as a result of a pitch condition, take-off 25 develops a pitch signal which is communicated to the input of the elevator channel of amplifier 18, the output of the channel being connected to energize a motor 30 which connects through a clutch 31 with elevator surface 23. Operation of motor 30 displaces an inductive follow-up device 32 developing a follow-up signal therein which is impressed on the elevator channel of amplifier 18 in series with the signal of pitch take-off 25 to modify the operation of motor 30.

A turn is produced by impressing on the rudder channel of amplifier 18 an independent source of potential having proper magnitude and phase in series with the compass signal transmitter 16, rate of turn pick-off 12 and rudder follow-up device 21, as will hereinafter be described. When a turn signal is introduced into the automatic pilot, clutch 17 is de-energized thereby disconnecting the compass 11 from the rudder servo system and rudder 10 is deflected causing the aircraft to turn at a rate controlled by the rate of turn gyro. The aircraft continues to turn at its impressed rate until the turn signal is terminated whereupon clutch 17 is energized connecting the compass 11 to the rudder servo system thereby causing the craft to be maintained on the new course.

A bank is brought about by impressing on the aileron channel of amplifier 18 an independent source of potential having the proper magnitude and phase in series with the bank take-off 24 and follow-up device 29. When a bank signal is introduced into the automatic pilot, aileron 22 is deflected causing the aircraft to bank at an angle fixed by the magnitude of the impressed signal. The aircraft remains in the banked condition until the bank signal is terminated whereupon a level attitude is assumed.

A change in pitch is brought about by impressing on the elevator channel of amplifier 18 an independent source of potential having the proper magnitude and phase in series with the pitch take-off 25 and follow-up device 32, to be hereinafter described. When a pitch signal is introduced into the automatic pilot, elevator 23 is deflected causing the aircraft to climb or dive at an angle fixed by the magnitude of the impressed signal. The aircraft will remain in the dive or climb until the pitch signal is terminated whereupon a level attitude is assumed.

The novel control means whereby remotely transmitted displacement signals for any axis of control are introduced into an electric automatic pilot so that the craft control surfaces are deflected in position is designed to operate in conjunction with conventional radio transmitting and receiving equipment. The operator's controller may be any type of conventional generating device capable of producing signals of various time durations and frequencies.

It is desirable to be able to impart into the electric automatic pilot signals for the following operations:

1. Co-ordinated left turn
2. Co-ordinated right turn
3. "Skid" left turn
4. "Skid" right turn
5. Climb
6. Dive
7. Termination of operation.

The various enumerated operations are characterized by signals of different frequencies. The various amounts of displacement of the craft control surfaces in the operations of co-ordinated left and right turns, climb and dive are each identified by a definite time duration of its characteristic signal. For the "skid" turns and the termination of operation, it is necessary that their characteristic signals be of continuous time duration terminable by the operator.

The signal modulating, transmitting, receiving and selecting devices per se do not form any part of the present invention and any suitable radiant energy modulating, transmitting, receiving and selecting means may be used.

The displacement signals transmitted from the control station, which may be located either on the ground or in another aircraft, are picked up by the receiver, directed to the proper channel by the selector and inserted into the electric automatic pilot by the novel control unit 9 constituting the subject matter of the present invention. The novel control unit 9 through the movement of potentiometers by small direct current motors operated in response to radio actuated relays impresses an independent source of potential upon the various control channels of amplifier 18 thereby producing displacements of the various control surfaces.

The novel control unit 9 constituting the subject matter of the present invention illustrated schematically in Figure 2, comprises two direct current motors; one—the turn motor 33 driving turn potentiometer 34, aileron potentiometer 35 and elevator potentiometer 36, and the second—the pitch motor 37 driving pitch potentiometer 38.

Operation of turn motor 33 is controlled by relays 39, 40, 45, 46 and 61, and by limit switches 41, 42, 43, and 44. Operation of pitch motor 37 is controlled by relays 46, 47, 48, 53 and 61, and by limit switches 49, 50, 51 and 52. The "skid" turn signal as distinct from a co-ordinated turn is controlled by relays 39, 40, 54, 55, 56 and 57. Disengagement of clutch 17 and the elimination of compass 11 from the control of the automatic pilot during turns is secured when either relay 55 or limit switch 58 is actuated. To vary the speed of pitch motor 37 and the follow-up ratios of rudder 10, aileron 22 and elevator 23 from those suitable to cruise speed to those suited to wheels down, flaps down condition, relay 59 is employed. In order to vary the rudder off-set to counteract the engine torque at various speeds relays 59 and 60 are utilized. Since it is necessary to regulate the amount of rudder applied during co-ordinated turns when a speed of 240 knots is attained, relay 60 is used. To provide for quick starting and to maintain proper speed of the pitch motor 37 during cruise conditions, relay 105 is employed. Provision is made for the return of turn motor 33 and pitch motor 37 to center by the actuation of relay 61 when the automatic pilot is disengaged.

The power to operate the novel control unit 9 is supplied by battery 89 whose positive terminal is connected through switch 90 to load bus 91 and negative terminal is grounded. The shunt fields of turn motor 33 and pitch motor 37 are continuously excited from load bus 91.

Relay 39 is provided to receive the left turn signal from the selector, while relay 40 receives the right turn signal. Relay 39 is comprised of fixed contact 39A and fixed contact 39B engaged with movable armature 39C. Relay 40 is comprised of fixed contact 40A and fixed contact 40B engaged with movable armature 40C.

One terminal of the operating coil of relay 39 is connected to the selector where it receives the left turn signal, while the other terminal is connected to ground. Contact 39B is connected to ground, contact 39A is connected to load bus 91. Armature 39C is connected through armature 55F and contact 55E of relay 55, contact 41B and armature 41C of limit switch 41, contact 45E and armature 45F of relay 45 to terminal 33B of turn motor 33. One terminal of the operating coil of relay 40 is connected to the selector where it receives the right turn signal, while the other terminal is connected to ground. Contact 40B is connected to ground, contact 40A is connected to load bus 91, while armature 40C is connected through armature 55C and contact 55B of relay 55, contact 42B and armature 42C of limit switch 42, contact 45B and armature 45C of relay 45 to terminal 33A of turn motor 33. When no turn signal is imparted into the novel control unit 9, terminals 33A and 33B of turn motor 33 are grounded. When a left turn signal is imparted into the novel control unit 9, relay 39 is energized causing armature 39C to disengage from contact 39B, to break the ground connection, and to engage with contact 39A to supply, for the time duration of the turn signal, potential to operate turn motor 33. At the termination of the turn signal, relay 39 is de-energized causing armature 39C to disengage from contact 39A, to remove the source of potential, and to engage with contact 39B, to ground turn motor 33. The grounding of the terminals of turn motor 33 applies a short-circuit to its armature, to bring turn motor 33 to an immediate stop by dynamic braking.

In like manner when a right turn signal is imparted into the novel control unit 9, relay 40 is energized causing armature 40C to disengage from contact 40B, to break the ground connection, and to engage with contact 40A to supply, for the time duration of the turn signal, potential to operate turn motor 33. At the termination of the turn signal relay 40 is de-energized causing armature 40C to disengage from contact 40A, to remove the source of potential, and to engage with contact 40B, to ground the terminals of turn motor 33 to bring it to an immediate stop. The amount of angular displacement of turn motor 33 and consequently the direct connected turn potentiometer 34, aileron potentiometer 35 and elevator potentiometer 36 from the center position depends on the time duration of the turn signal.

Adjustable limit switches 41 and 42 are provided for either direction of rotation of the turn potentiometers. Limit switch 41 is comprised of fixed contact 41A and fixed contact 41B engaged with movable armature 41C. Limit switch 42 is comprised of fixed contact 42A and fixed contact 42B engaged with movable armature 42C. Contact 41A is connected to ground. During a left turn operation of turn motor 33, contact 41B is connected through contact 55E and armature 55F of relay 55, armature 39C and contact 39A of relay 39 to load bus 91. Armature 41C is connected through contact 45E and armature 45F of relay 45 to terminal 33B of turn motor 33. When the potentiometers 34, 35, and 36 are rotated to their extreme left limit position, insulated arm 92 attached to the shaft of the potentiometers 34, 35 and 36 disengages armature 41C from contact 41B, to remove the potential from turn motor 33, and causes engagement with contact 41A, to ground the armature of turn motor 33 bringing it to an immediate stop.

Contact 42A is connected to ground. During a right turn operation of turn motor 33, contact 42B is connected through contact 55B and armature 55C of relay 55, armature 40C and contact 40A of relay 40 to load bus 91. Armature 42C is connected through contact 45B and armature 45C of relay 45 to terminal 33A of turn motor 33. When the potentiometers 34, 35 and 36 are rotated to their extreme right limit position, insulated arm 92 disengages armature 42C from contact 42B, to remove the potential from turn motor 33, and causes engagement with contact 42A, to ground the armature of turn motor 33 bringing it to an immediate stop.

It is to be noted that when turn motor 33 is brought to a stop by either limit switch 41 or 42, it is free to operate in the opposite direction since the circuit for rotation in the opposite direction is not disturbed. When turn motor 33 is rotated towards center from either of its extreme limit positions, armature 41C or 42C assumes its normal position in respective engagement with contact 41B or 42B.

Relays 46, 45 and limit switches 43, 44 are provided to return turn motor 33 to center after termination of operation. Relay 46 is comprised of fixed contact 46A and movable armature 46C. Relay 45 is comprised of fixed contacts 45A, 45D, 45G, and fixed contacts 45B, 45E, 45H respectively engaged with movable armatures 45C, 45F, 45J. Limit switch 43 is comprised of fixed contact 43A and fixed contact 43B engaged with movable armature 43C. Limit switch 44 is comprised of fixed contact 44A and fixed contact 44B engaged with movable armature 44C. Fixed contacts 43B and 44B are connected to ground, fixed contacts 43A and 44A are connected to load bus 91 and armatures 43C and 44C are respectively connected to fixed contacts 45D and 45A.

One terminal of the operating coil of relay 46 is connected to the selector where it receives the termination of operation signal, while the other terminal is connected to the ground. The termination of operation signal is continuous unless terminated by the operator by introducing a signal for another turn operation or by cutting off the termination of operation signal. Contact 46A is connected to ground, while movable armature 46C is connected to one terminal of the operating coil of relay 45. The other terminal of the operating coil of relay 45 is connected to load bus 91. Contact 45B is connected through armature 42C and contact 42B of limit switch 42, contact 55B and armature 55C of relay 55, armature 40C and contact 40B of relay 40 to ground. Contact 45E is connected through armature 41C and contact 41B of limit switch 41, contact 55E and armature 55F of relay 55, armature 39C and contact 39B of relay 39 to ground.

Displacement of the shaft of potentiometers 34, 35, 36 off-center for a left turn immediately causes an insulated arm 93 attached to said aforementioned shaft to disengage armature 44C from contact 44B and to engage contact 44A until the shaft of potentiometers 34, 35, 36 is again returned to center.

When a termination of operation signal is imparted into the novel control unit 9, relay 46 is actuated causing armature 46C to engage with contact 46A to actuate relay 45. The actuation of relay 45 causes armature 45C to disengage from contact 45B and to engage with contact 45A, connected through armature 44C and contact 44A to load bus 91; and causes armature 45F to disengage from contact 45E and to engage with contact 45D, connected through armature 43C and fixed contact 43B to ground, thus completing a circuit for the reverse rotation of turn motor 33 back to center. Upon the return of the shaft of potentiometers 34, 35, 36 to center, armature 44C disengages contact 44A and engages grounded contact 44B, to short circuit the armature of turn motor 33 bringing it to an immediate stop.

Displacement of the shaft of potentiometers 34, 35, 36 off-center to the right immediately causes an insulated arm 94 attached to said shaft to disengage armature 43C from contact 43B and to engage contact 43A until the shaft of potentiometers 34, 35, 36 is returned to center. The termination of operation signal imparted into the control unit 9 connects terminal 33A through armature 45C, contact 45A, armature 44C, and contact 44B to ground and terminal 33B through armature 45F, contact 45D, armature 43C and contact 43A to load bus 91, completing the circuit for the reverse rotation of turn motor 33 to center. Upon the return of the shaft of potentiometers 34, 35, 36 to center, armature 43C disengages contact 43A and engages grounded contact 43B, to short-circuit the armature of turn motor 33 bringing it to an immediate stop by dynamic braking.

Relays 39, 40, 54, 55, 56 and 57 are utilized to produce "skid" turns. Relay 54 is comprised of fixed contact 54A and movable armature 54C. Relay 55 is comprised of fixed contacts 55A, 55D, 55G, 55M and fixed contacts 55B, 55E, 55H, 55K respectively engaged with movable armatures 55C, 55F, 55J, 55L. Relay 56 is comprised of fixed contact 56A and movable armature 56C. Relay 57 is comprised of fixed contact 57A and movable armature 57C.

One terminal of the operating coil of relay 54 is connected to the circuit selector where it receives the "skid" signal, while the other terminal is connected to ground. Contact 54A is connected to ground, while movable armature 54C is connected to one terminal of the operating coil of relay 55. The other terminal of the operating coil of relay 55 is connected to load bus 91. Contact 55A is connected through the operating coil of relay 56 to ground. Contact 55B is connected through contact 42B and armature 42C of limit switch 42, contact 45 and armature 45C of relay 45 to terminal 33A of turn motor 33. Armature 55C is connected through armature 40C and contact 40B of relay 40 to ground. Contact 55D is connected through the operating coil of relay 57 to ground. Contact 55E is connected through contact 41B and armature 41C of limit switch 41, contact 45E and armature 45F of relay 45 to terminal 33B of turn motor 33. Armature 55F is connected through armature 39C and contact 39B of relay 39 to ground. Contact 56A and armature 56C are connected across resistor 68, while contact 57A and armature 57C are connected across resistor 67 (Fig. 1).

To impart a "skid" turn signal into the control unit 9, it is necessary to employ two independent continuous signals, first—a "skid" signal, and second—a turn signal. When a "skid" signal is imparted into the control unit, relay 54 is actuated causing armature 54C to engage contact 54A to energize the operating coil of relay 55. The actuation of relay 55 causes armatures 55C and 55F respectively to disengage from contacts 55B and 55E and to engage contacts 55A and 55D, to interrupt the circuit of turn motor 33 and to connect the operating coils of relays 56 and 57 respectively to armature 40C of relay 40 and armature 39C of relay 39.

If a right turn is imparted into the control unit 9, relay 40 is actuated causing armature 40C to disengage contact 40B and to engage contact 40A, connected to load bus 91, energize relay 56. The actuation of relay 56 causes armature 56C to engage fixed contact 56A to short circuit resistor 68 (Fig. 1) thereby imparting a hard-over right turn signal into the automatic pilot. If a left turn signal is imparted into the control unit, relay 39 is actuated causing armature 39C to disengage contact 39B and to engage contact 39A, connected to load bus 91, to energize relay 57. The actuation of relay 57 causes armature 57C to engage fixed contact 57A to short circuit resistor 67 (Fig. 1) thereby imparting a hard-over left turn signal into the automatic pilot. The "skid" turn signals are maintained continuously until terminated by the operator upon completion of the turn.

When a turn signal is imparted into the automatic pilot by the control unit, it is necessary that the compass 11 be disconnected from the rudder servo system. To this end limit switch 58 (Fig. 1) is provided to disconnect compass 11 from the rudder servo system. When a "skid" turn signal is imparted in the control unit, fixed contact 55H and movable armature 55J of relay 55 are utilized to disconnect the compass 11 from the rudder servo system. Limit switch 58 is comprised of fixed contact 58B engaged with movable armature 58C. Contact 55H is connected through clutch 17 to ground. Armature 55J is connected through contact 58B, movable armature 58C, the automatic pilot disconnect switch, to load bus 91.

In response to a co-ordinated turn signal imparted in the control unit 9, displacement of the shaft of potentiometers 34, 35, 36 off-center in either direction immediately causes an insulated arm 95 turned by the motor 33 to disengage armature 58C from contact 58B to interrupt the circuit energizing clutch 17, thereby disconnecting compass 11 from the rudder servo system. Armature 58C is maintained in continuous disengagement from contact 58B until the shaft of potentiometers 34, 35, 36 is returned to center by the termination of operation signal.

It is desirable to connect compass 11 to the rudder servo system immediately when the termination of operation signal is impressed into the control unit 9 thereby eliminating the time lag introduced in returning the shaft of potentiometers 34, 35, 36 to center. To this end fixed contact 45G and movable armature 45J of relay 45 are utilized and are respectively connected to contact 58B and movable armature 58C. When the termination of operation signal is impressed into the control unit, the actuation of relay 45 by relay 46 causes armature 45J to engage contact 45G thereby energizing clutch 17 in advance of limit switch 58 assuming its normal position. In response to "skid" signal movable armature 55J is disengaged from fixed contact 55H to interrupt the circuit energizing clutch 17 to disconnect compass 11 from the rudder servo system. When the "Skid" signal is discontinued, relay 55 is de-energized resulting in the immediate engagement of movable armature 55J with fixed contact 55H to energize clutch 17.

Relay 47 is provided to receive the climb signal from the circuit selector, while relay 48 receives the dive signal. Relay 47 is comprised of fixed contact 47A and fixed contact 47B engaged with movable armature 47C. Relay 48 is comprised of fixed contact 48A and fixed contact 48B engaged with movable armature 48C.

One terminal of the operating coil of relay 47 is connected to the selector where it receives the climb signal, while the other terminal is connected to ground. Contact 47A is connected to load bus 91. Contact 47B is connected to ground. Armature 47C is connected through contact 49B and armature 49C of limit switch 49, contact 53E and armature 53F of relay 53, to terminal 37B of pitch motor 37. One terminal of the operating coil of relay 48 is connected to the circuit selector where it receives the dive signal, while the other terminal is connected to ground. Contact 48A is connected to load bus 91. Contact 48B is connected to ground. Armature 48C is connected through resistor 100, contact 50B and armature 50C of limit switch 50, contact 53B and armature 53C of relay 53 to terminal 37A of pitch motor 37. When no pitch signal is imparted into the control unit 9, terminals 37A and 37B of pitch motor 37 are grounded.

When a climb signal is imparted into the control unit, relay 47 is energized causing armature 47C to disengage from contact 47B, to break the ground connection, and to engage with contact 47A, to supply, for the time duration of the climb signal, potential to operate pitch motor 37. At the termination of the climb signal, relay 47 is de-energized causing armature 47C to disengage from contact 47A, to remove the source of potential, and to engage with contact 47B, to ground pitch motor 37. The grounding of the terminals of pitch motor 37 applies a short-circuit to its armature, to bring pitch motor 37 to an immediate stop by dynamic braking.

In like manner when a dive signal is imparted into the control unit 9, relay 48 is energized causing armature 48C to disengage from contact 48B, to break the ground connection, and to engage with contact 48A to supply, for the time duration of the dive signal, potential to operate pitch motor 37. At the termination of the dive signal, relay 48 is de-energized causing armature 48C to disengage from contact 48A, to remove the source of potential and to engage with contact 48B, to ground the terminals of pitch motor 37 to bring it to an immediate stop. The amount of angular displacement of pitch motor 37 and consequently the direct connected pitch potentiometer 38 from the center position is dependent on the time duration of the pitch signal.

Adjustable limit switches 49 and 50 are provided for either direction of rotation of the pitch potentiometer 38. Limit switch 49 is comprised of fixed contact 49A and fixed contact 49B engaged with movable armature 49C. Limit switch 50 is comprised of fixed contact 50A and fixed contact 50B engaged with movable armature 50C. Contacts 49A and 50A are connected to ground.

During a climb operation of pitch motor 37, contact 49B is connected through armature 47C and contact 47A of relay 47 to load bus 91. Armature 49C is connected through contact 53E and armature 53F of relay 53 to terminal 37B of pitch motor 37. When potentiometer 38 is rotated to its extreme climb limit position, insulated arm 96 attached to the shaft of potentiometer 38 disengages armature 49C from contact 49B, to remove the potential from the pitch motor 37, and causes engagement with contact 49A, to ground the armature of pitch motor 37 bringing it to an immediate stop.

During a dive operation of pitch motor 37, contact 50B is connected through resistor 100, armature 48C and contact 48A to load bus 91. Armature 50C is connected through contact 53B and armature 53C of relay 53 to terminal 37A of pitch motor 37. When potentiometer 38 is rotated to its extreme dive limit position, insulated arm 96 disengages armature 50C from contact 50B, to remove the potential from pitch motor 37, and causes engagement with contact 50A, to ground the armature of pitch motor 37 bringing it to an immediate stop by dynamic braking. It is to be noted that when pitch motor 37 is brought to a stop by either limit switch 49 or 50, it is free to operate in the opposite direction since the circuit for rotation in the opposite direction is not disturbed. When pitch motor 37 is rotated towards center from either extreme limit positions, armature 49C or 50C assumes its normal position in respective engagement with contact 49B or 50B.

Relays 46, 53 and limit switches 51, 52 are provided to return pitch motor 37 to center after termination of operation. Relay 53 is comprised of fixed contacts 53A, 53D and fixed contacts 53B, 53E respectively engaged with movable armatures 53C, 53F. Limit switch 51 is comprised of fixed contact 51A and fixed contact 51B engaged with movable armature 51C. Limit switch 52 is comprised of fixed contact 52A and fixed contact 52B engaged with movable armature 52C. Contacts 51A and 52A are connected to ground. Armatures 51C and 52C are respectively connected to contacts 53D and 53A. One terminal of the operating coil of relay 53 is connected to movable armature 46C. The other terminal of the operating coil of relay 53 is connected to load bus 91.

Displacement of the shaft of potentiometer 38 off-center for a climb causes an insulated arm 97 attached to said aforementioned shaft to immediately disengage armature 52C from contact 52B and to continuously engage contact 52A until the shaft of potentiometer 38 is returned to center.

When a termination of operation signal is imparted into the control unit 9, relay 53 is also actuated by the energization of relay 46. The actuation of relay 53 causes armature 53C to disengage from contact 53B and to engage with contact 53A, connected through armature 52C and contact 52A to load bus 91, and armature 53F to disengage from contact 53E and to engage with contact 53D, connected through armature 51C and contact 51B to ground, thus completing a circuit for the reverse rotation of pitch motor 37 to center. Upon the return of the shaft of potentiometer 38 to center, armature 52C disengages contact 52A and engages grounded contact 52B to short-circuit the armature of pitch motor 37 bringing it to an immediate stop.

Displacement of the shaft of potentiometer 38 off-center to a dive causes an insulated arm 98 attached to said aforementioned shaft to immediately disengage armature 51C from contact 51B and to engage contact 51A until the shaft of potentiometer 38 is returned to center. The termination of operation signal imparted into the control unit 9 connects terminal 37B through armature 53F, contact 53D, armature 51C, contact 51A to load bus 91 and armature 53C, contact 53A, armature 52C and contact 52B to ground, thus completing a circuit for the reverse rotation of pitch motor 37 to center. Upon the return of the shaft of potentiometer 38 to center, armature 51C disengages contact 51A and engages grounded contact 51B to short-circuit the armature of pitch motor 37 bringing it to an immediate stop.

Relay 61 is provided to operate turn motor 33 and pitch motor 37 back to center, whenever the automatic pilot is disengaged with either of these motors off-center. Relay 61 is comprised of fixed contact 61B engaged with movable armature 61C. One terminal of the operating coil of relay 61 is connected through automatic pilot disconnect 99 to load bus 91, while the other terminal is grounded. Contact 61B is connected to movable armature 46C of relay 46 to which are also connected one terminal of the operating coils of relays 45 and 53. Armature 61C is connected to ground.

Whenever either turn motor 33 or pitch motor 37 is off-center, a circuit is set up by limit switches 43, 44, 51, 52, as previously described, for operation back to center. When the automatic pilot is engaged, relay 61 is energized, causing armature 61C to be disengaged from contact 61B. Disengagement of the automatic pilot with either turn motor 33 or pitch motor 37 is off-center, de-energizes relay 61 causing armature 61C to engage with contact 61B, to energize relay 45 and 53. The actuation of relays 45 and 53 completes the circuits for the reverse operation of turn motor 33 and pitch motor 37 back to center.

The independent source of potential, required, when the displacement signal is introduced into the automatic pilot, is supplied by transformer 62 (Fig. 1) comprising of primary winding 62A and secondary windings 62B, 62C, 62D, 62E, 62F and 62G. Primary winding 62A is connected to the aircraft's alternating current power supply. Secondary windings 62B, 62C, 62D and 62G are provided with center taps.

Secondary winding 62B impresses a potential through dropping resistors 63, 64, 65 and 66 upon center tapped turn potentiometer 34. One terminal of secondary winding 62B is connected to resistor 65 and through resistor 63 to one terminal of potentiometer 34, while the second terminal of secondary winding 62B is connected to resistor 66 and through resistor 64 to the second terminal of potentiometer 34. The center taps of turn potentiometer 34 and the secondary winding 62B are solidly connected together to increase the safety factor in case of faults and to prevent the center tap of potentiometer 34 shifting from null. The magnitude of the signal voltage tapped off between the center tap and movable arm of turn potentiometer 34 is dependent on the values of resistors 63, 64, 65 and 66 and on the displacement of the movable arm of turn potentiometer 34 and its phase dependent on the direction in which the arm is moved. Movement of the arm of turn potentiometer 34 in a direction away from its center tap towards the terminal to which resistor 64 is connected produces a potential for a right turn, while movement of the arm in the opposite direction produces a potential for a left turn. The resultant signal potential is impressed upon the rudder channel of amplifier 18 in series with the other rudder signals. Resistors 63 and 64 provide a means of co-ordinating the aircraft's rate of turn set in by the turn potentiometer 34 with the angle of bank set in by the aileron potentiometer 35, the adjustment being independently variable on either side. Resistor 63 may be adjusted to obtain appropriate rudder in a left turn, while resistor 64 for turns towards the right.

To provide for the reduction of the turn signal when the speed of 240 knots is reached, relay 60 (Fig. 2), energized through speed switch 101 actuated by a speed responsive device (not shown), is utilized. Relay 60 is comprised of fixed contacts 60A, 60D, 60G and fixed contacts 60B, 60E, 60H respectively engaged with movable armatures 60C, 60F, 60J. Resistor 65 (Fig. 1) is short-circuited by contact 60B and armature 60C, while resistor 66 is short-circuited by contact 60E and armature 60F.

When a speed of 240 knots is reached, relay 60 is actuated to cause armatures 60C and 60F to respectively disengage from contacts 60B and 60E, removing the short circuits from resistors 65 and 66. The insertion of resistors 65 and 66 into the circuit supplying potential to potentiometer 34, reduces the potential impressed upon potentiometer 34, thereby decreasing the signal potential for any given displacement of the arm of turn potentiometer 34.

Secondary winding 62C impresses a potential through resistors 69 and 70 upon series connected resistors 67 and 68. Across resistor 67 fixed contact 57A and movable armature 57C of relay 57 are connected, while across resistor 68, fixed contact 56A and movable armature 56C of relay 56 are connected. The center tap of secondary winding 62C is connected through armature 55L and contact 55K of relay 55 to the junction point of resistors 67 and 68. The signal voltage is tapped off between the center tap of secondary winding 62C and the junction of resistors 67 and 68. The short-circuiting of the "skid" turn signal source by armature 55L and contact 55K of relay 55 when not in use increases the safety factor in case of faults and is broken when the "skid" signal is introduced into controller 9 energizing relay 55. With armatures 55L, 56C, 57C respectively disengaged from contacts 55K, 56A, 57A, no voltage will appear between the center tap of secondary winding 62C and the junction point of resistors 67 and 68. With armature 56C engaged with contact 56A thus short-circuiting resistor 68 and armatures 55L, 57C respectively disengaged from contacts 55K, 57A, the potential and phase of the resultant signal is such that a hard-over right rudder signal is obtained, while with armature 57C engaged with contact 57A thus short-circuiting resistor 67 and armatures 55L, 56C respectively disengaged from contacts 55K, 56A, the potential and phase of the resultant signal is such that a hard-over left rudder signal is obtained. The resultant signal is impressed upon the rudder channel of the amplifier 18 in series with the other rudder signals.

Secondary winding 62D impresses a potential through dropping resistors 71 and 72 upon center-tapped aileron potentiometer 35. The center taps of aileron potentiometer 35 and secondary winding 62D are solidly connected together to increase the safety factor in case of faults and to prevent the center tap of potentiometer 35 shifting from null. The signal voltage is tapped off between the center tap and movable arm of aileron potentiometer 35 and its magnitude and phase is dependent on the values of resistors 71 and 72 and on the amount and direction of the displacement of the potentiometer arm. Resistors 71 and 72 provide a means of adjusting the maximum signal from the aileron potentiometer 35, in this way limiting the maximum angle of bank set in by the turn control. Movement of the arm of aileron potentiometer 35 in a direction away from its center tap towards the terminal to which resistor 72 is connected produces a bank signal for a right turn, while movement of the arm in the opposite direction produces a bank signal for a left turn. The resultant signal potential is impressed upon the aileron channel of amplifier 18 in series with the other aileron signals.

Secondary winding 62E impresses a potential upon elevator potentiometer 36. One terminal of secondary winding 62E is connected to the center tap of the elevator potentiometer 36 while the other terminal through dropping resistors 73 and 74 is connected to the opposite end terminals of elevator potentiometer 36. The signal potential is tapped off between the center tap and movable arm of elevator potentiometer 36 and its magnitude is dependent on the displacement of the potentiometer arm. The phase of the signal potential is the same to either side of the center tap. As the elevator turn potentiometer 36 is moved, a signal results which calls for an up-elevator correction in each case. The amount of up-elevator correction is independently variable for turns to either side, resistor 73 controlling the amount of up-elevator in a left turn, resistor 74 in a right turn. The resultant signal potential is impressed upon the elevator channel of amplifier 18 in series with the other elevator signals.

Secondary winding 62F impresses a potential through resistors 75 and 77 upon resistor 76. Resistors 75 and 76 have each an adjustable tap-off terminal. The rudder offset signal potential is tapped off between the junction of resistors 75 and 76 and the adjustable tap-off terminal of resistor 76 and impressed upon the rudder channel of amplifier 18 in series with the other rudder signals. The rudder offset signal produces a deflection of the rudder for a right turn. At normal cruising conditions with wheels and flaps raised, to counteract for engine torque a signal corresponding to a rudder offset of approximately 3° is required. To counteract for both engine torque and wheels and flaps down condition, a signal corresponding to a rudder offset of approximately 8° is required.

When a speed of 240 knots is reached, no rudder offset is necessary. To provide for the adjustment of the rudder offset for the different speeds, relay 59 (Fig. 2) and fixed contact 60G and movable armature 60J of relay 60 are utilized. Relay 59 (Fig. 2) is comprised of fixed contacts 59A, 59D, 59G, 59K and fixed contacts 59B, 59E, 59H, 59L respectively engaged with movable armatures 59C, 59F, 59J, 59M. Armature 59C and contact 60G are connected to the junction of resistors 75 and 76, while fixed contact 59A and armature 60J are respectively connected to the adjustable tap-off terminals of resistors 75 and 76.

At cruising speed with wheels and flaps up, relays 59 and 60 are both de-energized, so that armatures 59C and 60J are respectively dis-engaged from contacts 59A and 60G, the rudder offset signal potential tapped off resistor 76 produces a rudder offset of 3°. When wheels and flaps are lowered, relay 59, responsive thereto, is energized thereby causing armature 59C to engage contact 59A to short-circuit the tapped section of resistor 75. The short-circuiting part of resistor 75 impresses a greater potential upon resistor 76, thereby increasing the rudder offset signal to produce a rudder offset of approximately 8°. When a speed of 240 knots is reached, relay 60 is energized through contacts 101 actuated by speed responsive means (not shown) whereby armature 60J engages contact 60G to short-circuit the tapped section of resistor 76 eliminating completely the rudder offset signal.

Secondary winding 62G impresses a potential through dropping resistors 78 and 79 upon center-tapped pitch potentiometer 38. The center taps of pitch potentiometer 38 and secondary winding 62G are solidly connected together to increase the safety factor in case of faults and to prevent the center tap of potentiometer 34 shifting from null. Resistors 78 and 79 provide a means of adjusting the maximum voltage impressed upon pitch potentiometer 38; resistor 78 controlling dive and resistor 79 controlling climb. The magnitude and phase of signal voltage tapped off between the center tap and movable arm of pitch potentiometer 38 is dependent on the values of resistors 78 and 79 and on the amount and direction of the displacement of the potentiometer arm. Movement of the arm of pitch potentiometer 38 in a direction away from its center tap towards the terminal to which resistor 78 is connected produces a dive signal, while movement of the arm in the opposite direction produces a climb signal. The resultant pitch signal is impressed upon the elevator channel of amplifier 18 in series with other elevator signals.

The ratio of the movement of the control surfaces to the displacement of the aircraft can be varied both for cruising and for wheels-down, flaps down condition. Switching from one set of ratios to the other is accomplished by means of relay 59. The raising and lowering of the wheels and flaps, operates relay 59, varying not only the rudder, aileron and elevator ratios, but also the amount by which the rudder is offset to counteract for engine torque. The ratio for wheels down, flaps down condition is greater than that required for cruising speed. For the same displacement of craft it is necessary to have a greater movement of the control surfaces for a wheels down, flaps down condition than is required for cruising speed. The ratio of the movement of the control surfaces to the displacement of the aircraft is dependent on the amount of follow-up signal for each control surface. The rudder follow-up potential is impressed by the stator of the rudder follow-up device 21 through resistors 80 and 81 upon resistor 82. Across resistor 81 are connected armature 59C and fixed contact 59B. The rudder follow-up signal is taken off resistor 82 and its magnitude dependent upon the actuation of relay 59. For wheels down, flaps down condition, contacts 102, actuated thereby, energizes relay 59 causing armature 59C to disengage from contact 59B whereby the magnitude of the rudder follow-up potential impressed upon resistor 82 is determined by resistors 80, 81, 82. For cruising condition, relay 59 is de-energized so that armature 59C remains engaged with contact 59B to short-circuit resistor 81 causing the magnitude of the rudder follow-up potential impressed upon resistor 82 to be determined by resistors 80 and 82. Due to the disengagement of armature 59C from contact 59B when relay 59 is actuated, the rudder follow-up potential impressed upon resistor 82 is less for wheels down, flaps down condition than for cruising condition requiring thereby a larger displacement of the rudder control surface.

The aileron follow-up potential is impressed by the stator of the aileron follow-up device 29 through resistors 83 and 84 upon resistor 85. Across resistor 84 are connected movable armature 59F and fixed contact 59E. The aileron follow-up signal is taken off resistor 85 and its magnitude dependent upon the actuation of relay 59. For wheels down, flaps down condition, relay 59 is energized, disengaging armature 59F from contact 59E to cause the magnitude of the aileron follow-up potential impressed upon resistor 85 to be determined by resistors 83, 84, 85. For cruising condition, relay 59 is de-energized so that armature 59F remains engaged with contact 59E to short-circuit resistor 84 causing the magnitude of the aileron follow-up potential impressed upon resistor 85 to be determined by resistors 83 and 85. Due to the disengagement of armature 59F from contact 59E when relay 59 is actuated, the aileron follow-up potential impressed upon resistor 85 is less for wheels down, flaps down condition than for cruising condition requiring thereby a larger displacement of the aileron control surface.

The pitch follow-up potential is impressed by the stator of the pitch follow-up device 32 through resistors 86 and 87 upon resistor 88. Across resistor 87 are connected movable armature 59J and fixed contact 59H. The pitch follow-up signal is taken off resistor 88 and its magnitude dependent upon the actuation of relay 59.

For wheels down, flaps down condition, relay 59 is energized, disengaging armature 59J from contact 59H to cause the magnitude of the pitch follow-up potential impressed upon resistor 88 to be determined by resistors 86, 87, 88. For cruising condition, relay 59 is de-energized so that armature 59J remains engaged with contact 59H to short-circuit resistor 87 causing the magnitude of the pitch follow-up potential impressed upon resistor 88 to be determined by resistors 86 and 88. Due to the disengagement of armature 59J from contact 59H when relay 59 is actuated, the pitch follow-up potential impressed upon resistor 88 is less for wheels down, flaps down condition than for cruising condition requiring thereby a larger displacement of the elevator control surface.

For wheels down, flaps down condition, it is desirable that the speed of pitch motor 37 be stepped up. In order to adjust the speed of pitch motor 37, resistor 100 (Fig. 2) is inserted in series with its armature. Across resistor 100 are connected movable armature 59M and fixed contact 59K of relay 59. When relay 59 is energized by contacts 102 actuated as a result of wheels down, flaps down condition, armature 59M engages contact 59K to short-circuit resistor 100 thereby increasing the potential applied across the armature of pitch motor 37. In response to this increase of potential, the speed of pitch motor 37 is stepped up.

When a climb or dive signal is impressed into controller 9 it is desirable to secure a fast response from pitch motor 37. To this end relay 105, comprised of fixed contact 105B engaged with movable armature 105C, is utilized. Across resistor 100 are connected movable armature 105C and contact 105B. When the pitch signal is applied to either relay 47 or 48, the voltage from load bus 91 is impressed upon the armature of pitch motor 37 through armature 105C and contact 105B producing a quick start.

Due to the time lag of the operating coil of relay 105, armature 105C is disengaged from contact 105B to insert resistor 100 into the armature circuit of pitch motor 37 to limit its speed after the application of the quick start.

*Operation*

It may be assumed that the craft, upon which the novel controller 9 is employed in conjunction with an all electric automatic pilot, has been flying a level course under the control of an operator located at a station on the ground or in another plane. If the operator desires the craft to make a co-ordinated left turn of A degrees, he inserts such turn into the signal generator which produces a signal having a left turn frequency and a time duration corresponding to A degrees. The signal is modulated, transmitted and picked up by the aircraft receiver. The signal is demodulated by the receiver and passed on to the circuit selector where it is impressed upon the operating coil of relay 39.

Normally the terminals 33B and 33A of the armature of turn motor 33 are connected through movable armatures 39C, 40C and contacts 39B, 40B of relays 39 and 40, respectively to ground so that the armature of turn motor 33 is short-circuited. When relay 39 is energized, a circuit is set up for the operation of turn motor 33. The ground connection through contact 39B is broken, and terminal 33B of the armature of turn motor 33 is connected through contact 39A to the positive load bus 91 while terminal 33A remains grounded. Turn motor 33 rotates for the time duration of the signal. When the turn signal ends, relay 39 is deenergized whereupon the circuit through contact 39A to load bus 91 is broken and the terminal 33B of the armature of turn motor 33 is again grounded through contact 39B to short-circuit the motor armature bringing it to an immediate stop by dynamic braking.

In consequence of the actuation of turn motor 33, in response to a left turn signal, turn potentiometer 34, aileron potentiometer 35 and elevator potentiometer 36 each connected across independent sources of potential, are displaced from their null positions to produce the displacement signal potentials for the various control surfaces. These displacement signal potentials are impressed upon the rudder, aileron and elevator control channels of amplifier 18 of the automatic pilot in series with the other signal producing devices to bring about a co-ordinated left turn. The instant that shaft of the potentiometers 34, 35 and 36 is displaced from center, in either direction, insulated arm 95 attached to said shaft, operates limit switch 58 to de-energize clutch 17 thereby removing the compass control from the automatic pilot. The various control surfaces are deflected an amount to correspond with the time of the impressed turn signal. In response to the deflection of the control surfaces, the plane will turn at a rate fixed by such deflection. The amount of deflection of the rudder controls the rate at which the craft will turn. The craft will continue to turn at the rate fixed by the impressed signal until the turn signal is removed. When the turn signal ends, turn motor 33 and consequently potentiometers 34, 35 and 36 remain displaced from their null positions so that the displacement signals remain impressed upon their respective control channels of amplifier 18 of the automatic pilot until their removal by the operator as will presently appear.

The actuation of turn motor 33 for a left turn sets up a circuit for its operation back to center position by the utilization of limit switches 43 and 44 and relay 45. The instant that the shaft of the potentiometers 34, 35, 36 is displaced for a left turn from center, insulated arm 93, attached to said shaft, disengages armature 44C from grounded contact 44B to engage contact 44A connected to load bus 91, while armature 43C remains grounded through contact 43B. The connection of terminals 33A and 33B of the armature of turn motor 33 by means of relay 45 to armatures 44C and 43C respectively completes the circuit for rotation back to center.

When the plane has turned the desired A degrees, the operator sends through a termination of operation signal which is a continuous signal. As aforementioned the termination of operation signal is received and passed on to the circuit selector where it is impressed upon the operating coil of relay 46. Relay 46 energizes relay 45 which connects motor terminals 33A and 33B to armatures 44C and 43C to limit switches 44 and 43, respectively, to produce a rotation back to center. The instant that turn motor 33 and consequently the shaft of potentiometers 34, 35, 36 is returned to center, insulated arm 93 releases armature 44C from contact 44A, breaking the circuit to load bus 91, and terminal 33A of the armature of turn motor 33 is grounded through contact 44B to short-circuit the motor armature.

The actuation of relay 45 also energizes clutch 17 to introduce the compass into the automatic pilot placing the craft under the control of the compass the instant that termination of operation signal is received. The compass will maintain the craft on its new course. The return of the turn motor 33 to center removes the displacement signals from their respective control channels of amplifier 18 of the automatic pilot so that the craft will return to level flight from its banked turn attitude. Upon the return of the shaft of potentiometers 34, 35, 36 to center, insulated arm 95 releases limit switch 58 to maintain the circuit of clutch 17 when relay is de-energized upon the end of the termination of operation signal.

If the operator desires the craft to make a coordinated right turn of B degrees, he inserts such turn into the signal generator which produces a signal having a right turn frequency and a time duration corresponding to B degrees. As aforementioned the signal is received and passed on to the circuit selector where it is impressed upon the operating coil of relay 40. When relay 40 is energized, a circuit is set up for the operation of turn motor 33. The ground connection through contact 40B is broken and terminal 33A of the armature of turn motor 33 is connected through contact 40A to the positive load bus 91, while terminal 33B remains grounded. Turn motor 33 rotates for the time duration of the signal. When the signal ends, relay 40 is de-energized whereupon the circuit through contact 40A to load bus 91 is broken and terminal 33A of the armature of turn motor 33 is again grounded through contact 40B to short-circuit the motor armature.

The actuation of turn motor 33, in response to a right turn signal, displaces potentiometers 34, 35 and 36 to produce displacement signal potentials for the various control surfaces. These displacement signal potentials are impressed upon the rudder, aileron and elevator control channels of amplifier 18 of the automatic pilot in series with the other signal producing devices to bring about a co-ordinated right turn. The various control surfaces are deflected to correspond with the time of the impressed signal. In response to the deflection of the control surfaces, the plane will turn at a rate fixed by such deflection and will continue to turn at the rate fixed by the impressed signal until the turn signal is removed.

As in the case of a left turn, turn motor 33 and potentiometers 34, 35 and 36 remain displaced from their null positions for a right turn so that the displacement signals remain impressed upon their respective control channels of amplifier 18 until their removal by the operator.

The actuation of turn motor 33 for a right turn sets up a circuit for its operation back to center by the utilization of limit switches 43, 44 and relay 45. The instant that the shaft of the potentiometer 34, 35, 36 is displaced from center for a right turn, insulated arm 94, attached to said shaft, disengages armature 43C from grounded contact 43B to engage contact 43A which is connected to load bus 91, while armature 44C remains grounded through contact 44B. The connection of terminals 33A and 33B of the armature of turn motor 33 by means of relay 45 to armatures 44C and 43C respectively completes the circuit for rotation back to center.

When the plane has turned the desired B degrees, the operator sends through a termination of operation signal. As aforementioned relay 46 energizes relay 45 which connects terminals 33A and 33B of the armature of turn motor 33 to armatures 44C and 43C of limit switches 44 and 43, respectively, to produce a rotation back to center. The instant that turn motor 33 and consequently the shaft of potentiometers 34, 35, 36 is returned to center, insulated arm 94 releases armature 43C from contact 43A breaking the circuit to load bus 91, and terminal 33B of the armature of turn motor 33 is grounded through contact 43B to short-circuit the motor armature bringing it to an immediate stop.

Protection against overrunning of potentiometers 34, 35, 36 is provided by limit switches 41 and 42. If during the operation of a left turn, turn motor 33 should run beyond the allowable left limit, insulated arm 92 attached to the shaft of potentiometers 34, 35 and 36 operates limit switch 41 to disconnect terminal 33B from load bus 91 and grounds it through contact 41A to bring it to an immediate stop. In like manner during the operation of a right turn, turn motor 33 is brought to a stop by the operation of limit switch 42.

The skid turn voltage is tapped off between the center tap of secondary winding 62C and the junction of resistors 67 and 68 and impressed upon the rudder channel of the amplifier 18 in series with the other rudder signals. If the operator desires the craft to make a skid turn, it is necessary to insert two signals into the signal generator. The first signal is the skid signal which is a continuous signal. As aforementioned the "skid" signal is received and passed on to the circuit selector where it is impressed upon the operating coil of relay 54. Relay 54 energizes relay 55 which disconnects turn motor 33 from the circuit and connects the operating coils of relays 57 and 56 to the armatures 39C and 40C of relays 39 and 40 respectively. Relay 55 disengages clutch 17 thereby removing the compass from the control of the automatic pilot, and also breaks the connection between the center tap of secondary winding 62C and the junction of resistors 67 and 68.

If it is desired that the craft make a left skid turn, a left turn is then imparted into the signal generator which produces a continuous signal having a left turn frequency. The left turn signal is received and passed on to the circuit selector where it is impressed upon the operating coil of relay 39. Relay 39 actuates relay 57 short-circuiting resistor 67 whereby a hard-over left turn signal potential is obtained and impressed upon the rudder channel of amplifier 18 of the automatic pilot to produce a hard-over displacement of the rudder to the left.

When the plane has turned the desired amount, the operator ends the skid turn by terminating the skid signal. Termination of the skid signal de-energizes relay 55 whereby the clutch 17 is nergized to introduce the compass into the automatic pilot placing the craft under the control of the compass to maintain the new course. The de-energization of relay 55 also reconnects the center tap of winding 62C with the junction of resistors 67 and 68 to eliminate the hard-over left turn signal.

If it is desired that the craft make a right turn, a right turn is imparted after the skid signal into the signal generator which produces a continuous signal having a right turn frequency. The right turn is received and passed on to the circuit selector where it is impressed upon the operating coil of relay 40. Relay 40 actuates relay 56 short-circuiting resistor 68 whereby a hard-over right turn potential is obtained and impressed upon the rudder channel 18 of the automatic pilot to produce a hard-over displacement of the rudder to the right.

If the operator desires to place the craft into a climb at an angle D, he inserts the climb angle desired into the signal generator which produces a signal having a climb frequency and a time duration corresponding to D degrees. As aforementioned the signal is received and passed onto the circuit selector where it is impressed upon the operating coil of relay 47.

Normally the terminals 37A and 37B of the armature of pitch motor 37 are connected through movable armatures 48C, 47C and contacts 48B, 47B of relays 48 and 47 respectively to ground so that the armature of pitch motor 37 is short-circuited. When relay 47 is energized, a circuit is set up for the operation of pitch motor 37. The ground connection through contact 47B is broken and terminal 37B of the armature of pitch motor 37 is connected through contact 47A to the positive load bus 91, while terminal 37A remains grounded. Pitch motor 37 rotates for the time duration of the signal. When the climb signal ends, relay 47 is de-energized whereupon the circuit through contact 47A to load bus 91 is broken and the terminal 37B of the armature of pitch motor 37 is again grounded through contact 47B to short-circuit the motor armature bringing it to an immediate stop.

In consequence of the actuation of pitch motor 37 in response to a climb of D degrees, elevator potentiometer 38, connected across an independent source of potential, is displaced from its null position to create the climb displacement signal potential. This climb displacement signal potential is impressed upon the elevator control channel of amplifier 18 of the automatic pilot in series with the other signal producing devices to bring about a climb. The elevator surfaces are deflected to correspond with the impressed climb signal, the plane assuming a climb angle of D degrees, and will remain in that attitude until the climb displacement signal is removed by the termination of operation signal.

When the climb signal ends, pitch motor 37 and consequently elevator potentiometer 38 remains displaced from its null position so that the climb displacement signal remains impressed upon the elevator control channel of amplifier 18 of the automatic pilot until its removal by the operator as will presently be described.

The actuation of pitch motor 37 for a climb, sets up a circuit for its operation back to center position by the utilization of limit switches 51 and 52 and relay 53. The instant that the shaft of the potentiometer 38 is displaced from center for a climb insulated arm 97, attached to said shaft, disengages armature 52C from grounded contact 52B to engage contact 52A which is connected to load bus 91, while armature 51C remains grounded through contact 51B. The connection of terminals 37A and 37B of the armature of pitch motor 37 by means of relay 53 to armatures 52C and 51C respectively completes the circuit for rotation back to center.

In order to terminate the climb, the operator sends through a termination of operation signal. As aforementioned the termination of operation signal is received and passed on to the circuit selector where it is impressed upon the operating coil of relay 46. Relay 46 energizes relay 53 which connects the terminals 37A and 37B of the armature of pitch motor 37 to armatures 52C and 51C of limit switches 52 and 51 respectively to produce a rotation back to center. The instant that pitch motor 37 and consequently the shaft of potentiometer 38 is returned to center, insulated arm 97 releases armature 52C from contact 52A, breaking the circuit to load bus 91 and terminal 37A is grounded through contact 52B to short circuit the motor armature bringing it to an immediate stop. The return of pitch motor 37 to center removes the climb displacement signal from the elevator channel of amplifier 18 of the automatic pilot whereby the craft automatically assumes a level attitude.

If the operator desires to place the craft into a dive at an angle E, he inserts the dive angle desired into the signal generator which produces a signal having a dive frequency and a time duration corresponding to E degrees. As aforementioned the signal is received and passed onto the circuit selector where it is impressed upon the operating coil of relay 48. When relay 48 is energized, a circuit is set up for the operation of pitch motor 37. The ground connection through contact 48B is broken and terminal 37A is connected through contact 48A to the positive load bus 91, while terminal 37B remains grounded. Pitch motor 37 rotates for the time duration of the signal. When the signal ends, relay 48 is de-energized whereupon the circuit through 48A to load bus 91 is broken and terminal 37A of the armature of pitch motor 37 is again grounded through contact 48B to short-circuit the motor armature.

In consequence of the actuation of pitch motor 37 in response to a dive of E degrees, elevator potentiometer 38, is displaced from its null position to create the dive displacement signal potential. This dive displacement signal potential is impressed upon the elevator control channel 18 of the automatic pilot in series with the other signal producing devices to bring about a dive. The elevator surfaces are deflected to correspond with the impressed dive signal of E degrees. In response to the deflection of the elevator surfaces, the plane will assume a dive of E degrees and will remain in that attitude until the dive displacement signal is removed by the termination of operation signal.

When the dive signal ends, pitch motor 37 and elevator potentiometer 38 remains displaced from its null position so that the dive displacement signal remains impressed upon the elevator control channel of amplifier 18 of the automatic pilot until its removal by the operator.

The actuation of pitch motor 37 for a dive sets up a circuit for its operation back to center position by the utilization of limit switches 51 and 52 and relay 53. The instant that the shaft of the potentiometer 38 is displaced from center, insulated arm 98, attached to said shaft, disengages armature 51C from grounded contact 51B to engage contact 41A which is connected to load bus 91, while armature 52C remains grounded through contact 52B. The connection of terminals 37A and 37B of the armature of pitch motor 37 by means of relay 53 to armatures 52C and 51C respectively completes the circuit for rotation back to center.

In order to terminate the dive, the operator sends through a termination of operation signal. Relay 46 will cause energization of relay 53 which connects the terminals 37A and 37B of the armature of pitch motor 37 to armatures 52C and 51C of limit switches 52 and 51, respectively, to produce a rotation back to center. The instant that pitch motor 37 and consequently the shaft of potentiometer 38 is returned to center, insulated arm 98 releases armature 51C from contact 41A, breaking the circuit to load bus 91 and terminal 37B is grounded through contact 51B to short-circuit the motor armature bringing it to an immediate stop. The return of pitch motor 37 to center removes the dive displacement signal from the elevator channel of amplifier 18 of the automatic pilot whereby the craft automatically assumes a level attitude.

Protection against overrunning of potentiometer 38 is provided by limit switches 49 and 50. If, during the operation of a climb, pitch motor 37 should run beyond the allowable climb limit, insulated arm 96, attached to the shaft of potentiometer 38 operates limit switch 49 to disconnect terminal 37B of the motor armature from load bus 91 and grounding it through contact 49A bringing it to an immediate stop. In like manner, during the operation of a dive, pitch motor 37 is brought to a stop by the operation of limit switch 50.

Although but one embodiment of the present invention has been illustrated and described in detail, it is to be expressly understood that the invention is not limited thereto. Various changes may be made in the design and arrangement of the parts without departing from the spirit and scope of the invention as will now be understood by those skilled in the art. For a definition of the limits of the invention, reference will be had primarily to the appended claims.

Having thus described our invention, we claim as new and desire to secure by Letters Patent:

1. In an automatic pilot for aircraft having rudder, aileron, and elevator actuating motors controlled by signals developed by direction, turn, and attitude devices, the combination comprising a signal source, reversible motors, a relay circuit connected to said source and said motors for selectively operating said motors, a source of potential, a balanced impedance network in the pilot control circuits of the actuating motors connected to said potential source, said motors being adapted in response to the signal source to unbalance said networks to provide additional signals in the pilot control circuits, make and break means controlled by said relay circuit to disconnect the source of direction signal in the pilot control circuits, and to short a portion of said impedance networks to provide a hard over signal to the rudder actuating motor control circuit.

2. In an automatic pilot for aircraft having rudder, aileron, and elevator actuating motors controlled by signals developed by direction, turn, and attitude devices, the combination comprising a remote signal source, turn relays, a skid turn relay, a climb relay, a dive relay, and a termination relay responsive to the respective signals of said source, a turn reversible motor, and a pitch reversible motor; said motors being controlled by the turn and termination relays, and the climb, dive and termination relays, respectively: balanced impedance networks connected into the direction, turn, and attitude control circuits of the pilot actuating motors including resistors variable by the angular displacement of said motors, the turn motor controlling the variable resistors in the direction and turn circuits; and a source of signal potential for said impedance networks, the variations of the resistors by said motors unbalancing said networks to provide a signal potential altering the pilot signals.

3. In an automatic pilot for aircraft having rudder, aileron, and elevator actuating motors controlled by signals developed by direction, turn, and attitude devices, the combination comprising a signal source, turn relays, a skid turn relay, a climb relay, a dive relay, and a termination relay responsive to the respective signals of said source, a turn reversible motor, and a pitch reversible motor; said motors being controlled by the turn and termination relays, and the climb, dive and termination relays, respectively: balanced impedance networks connected into the direction, turn, and attitude control circuits of the pilot actuating motors including resistors variable by the angular displacement of said motors, the turn motor controlling the variable resistors in the direction and turn circuits; a source of signal potential for said impedance networks, the variations of the resistors by said motors unbalancing said impedance networks to provide a signal potential altering the pilot signals, switch means controlled by said turn motor and make and break means controlled by said skid relay to disconnect the source of pilot direction signal, and means controlled by said reversible motors and said termination relay for returning said motors to no signal condition.

4. In an automatic pilot for aircraft having rudder, aileron, and elevator actuating motors controlled by signals developed by direction, turn, and attitude devices, the combination comprising a signal source, turn relays, a skid turn relay, a climb relay, a dive relay, and a termination relay responsive to the respective signals of said source, a turn reversible motor, and a pitch reversible motor; said motors being controlled by the turn and termination relays, and the climb, dive and termination relays, respectively: balanced impedance networks connected into the direction, turn, and attitude control circuits of the pilot actuating motors including resistors variable by the angular displacement of said motors, the turn motor controlling the variable resistors in the direction and turn circuits; a source of signal potential for said impedance networks, the variations of the resistors by said motors unbalancing said networks to provide a signal potential altering the pilot signals, switch means controlled by said turn motor and make and break means controlled by said skid relay to disconnect the source of direction signal, said last means shorting a portion of the impedance network in the turn circuits to provide a hard-over signal to the rudder actuating motor in response to skid signals, and means controlled by said reversible motors and said termination relay for returning said motors to no signal condition.

5. In an automatic pilot for aircraft having rudder, aileron, and elevator actuating motors controlled by signals developed by direction, turn, and attitude devices, the combination comprising a remote signal source, two turn relays, a skid turn relay, a climb relay, a dive relay, and a termination relay responsive to the respective signals of said source; a turn reversible motor, and a pitch reversible motor; said motors being controlled by the turn and termination relays, and the climb, dive and termination relays, respectively: balanced impedance networks connected into the direction, turn, and attitude control circuits of the pilot actuating motors including resisors variable by the angular displacement of said motors; the turn motor controlling the variable resistors in the direction and turn circuits: a source of potential for said impedance networks, the variations of the resistors by said motors unbalancing said networks to provide a signal potential for altering the pilot signals; switch means controlled by said turn motor and make and break means controlled by said skid relay to disconnect the source of direction signal, said last means shorting a portion of the balanced impedance network in the turn circuits to provide a hard-over signal to the rudder actuating motor in response to skid signals; means responsive to aircraft speed to short another portion of the impedance network to eliminate rudder offset signals when a predetermined airspeed is reached, means responsive to a wheels-down, flaps-down condition for shorting still another portion of the impedance network to increase the rudder offset signals, switches controlled by said reversible motors for limiting the angular displacement thereof, and means controlled by said reversible motors and by said termination relay for returning said motors to no signal condition.

6. In an automatic pilot for aircraft having rudder, aileron and elevator actuating motors controlled by signals developed by direction, turn and attitude devices, the combination comprising a signal source, reversible motors, means connected to said source and to said reversible motors for selectively operating said reversible motors, a source of potential, balanced impedance networks in the pilot control circuits of the actuating motors connected to said potential source, means in said networks actuated by said reversible motors in response to the signal source to unbalance said networks to provide additional signals in the pilot control circuits, and make and break means responsive to the signal source to short a portion of said impedance networks and provide a hard-over signal to the rudder actuating motor.

7. In an automatic pilot for aircraft having rudder, aileron and elevator actuating motors controlled by signals developed by direction, turn and attitude devices, the combination comprising a source of potential, balanced impedance networks in the pilot control circuits of the actuating motors connected to the source of potential, a signal source, means adapted to unbalance said networks in response to the signal source to provide additional signals in the pilot control circuits to control the flight of the aircraft in accordance with the signal source, and make and break means controlled by said signal source to short a portion of said impedance networks and provide a hard-over signal to the rudder actuating motor.

8. In an automatic pilot for aircraft having rudder, aileron and elevator actuating motors controlled by signals developed by direction, turn and attitude devices, the combination comprising a source of potential, balanced impedance networks in the pilot control circuits of the actuating motors including variable resistors connected to the source of potential, a signal source, reversible motors adapted to vary the resistance of said resistors to unbalance said networks in response to the signal source to provide additional signals in the pilot control circuits to control the flight of the aircraft in accordance with the signal source, and a skid turn relay controlled by said signal source to short a portion of said impedance networks to provide a hard-over signal to the rudder actuating motor.

9. In an automatic pilot for aircraft having rudder, aileron and elevator actuating motors controlled by signals developed by direction and attitude devices, the combination comprising a signal source, reversible motors, a relay network interconnecting said reversible motors and said signal source for selectively operating said reversible motors in response to the signal source, impedances in the actuating motor circuits of the pilot varied by the operation of said reversible motors to vary the operation of the actuating motors in response to the signal source, and means responsive to aircraft speed to short a portion of the impedances to eliminate rudder signals when a predetermined air speed is reached.

10. In an automatic pilot for aircraft having rudder, aileron and elevator actuating motors controlled by signals developed by direction and attitude devices, the combination comprising a signal source, reversible motors, a relay network interconnecting said reversible motors and said signal source for selectively operating said motors in response to the signal source, impedances in the actuating motor circuits of the pilot varied by the operation of said reversible motors to vary the operation of the actuating motors in response to the signal source, said relay means including a skid relay to short a portion of the impedance in the turn circuits to provide a hard-over signal to the rudder actuating motor in response to skid signals.

11. In an automatic pilot for aircraft having rudder, aileron and elevator actuating motors controlled by signals developed by direction and attitude devices, the combination comprising a signal source, reversible motors, a relay network interconnecting said reversible motors and said signal source for selectively operating said reversible motors in response to the signal source, impedances in the actuating motor circuits of the pilot varied by the operation of said reversible motors to vary the operation of the actuating motors in response to the signal source, and means responsive to wheels-down, flaps-down condition for shorting a portion of the impedance in the rudder actuating motor circuit to increase the magnitude of the rudder off-set signals.

SABINE L. BARING-GOULD.
WILLIAM H. SLEEPER, JR.

REFERENCES CITED

The following references are of record in the file of this patent:

UNITED STATES PATENTS

| Number | Name | Date |
|---|---|---|
| 1,597,416 | Mirick | Aug. 24, 1926 |
| 1,766,524 | Loftin | June 24, 1930 |
| 1,924,857 | Hodgman | Aug. 29, 1933 |
| 1,958,258 | Alexanderson | May 8, 1934 |
| 2,109,475 | Fanning | Mar. 1, 1938 |
| 2,266,410 | Busignies | Dec. 16, 1941 |
| 2,397,475 | Dinga | Apr. 2, 1946 |
| 2,419,970 | Roe et al. | May 6, 1947 |
| 2,423,336 | Moseley | July 1, 1947 |
| 2,423,337 | Moseley | July 1, 1947 |
| 2,464,629 | Young | Mar. 15, 1949 |